(12) United States Patent
Riner (10) Patent No.: US 11,527,875 B2
(45) Date of Patent: Dec. 13, 2022

(54) MOUNTING BRACKET ASSEMBLY FOR AN ELECTRICAL RECEPTACLE SYSTEM

(71) Applicant: Group Dekko, Inc., Fort Wayne, IN (US)

(72) Inventor: Raymond H. Riner, Fort Wayne, IN (US)

(73) Assignee: Group Dekko, Inc., Fort Wayne, IN (US)

( * ) Notice: Subject to any disclaimer, the term of this patent is extended or adjusted under 35 U.S.C. 154(b) by 86 days.

(21) Appl. No.: 17/144,361

(22) Filed: Jan. 8, 2021

(65) Prior Publication Data

US 2022/0224092 A1 Jul. 14, 2022

(51) Int. Cl.
*H02G 3/10* (2006.01)
*H01B 7/00* (2006.01)

(52) U.S. Cl.
CPC ............. *H02G 3/10* (2013.01); *H01B 7/0045* (2013.01)

(58) Field of Classification Search
None
See application file for complete search history.

(56) References Cited

U.S. PATENT DOCUMENTS

| | | | | |
|---|---|---|---|---|
| 4,135,775 A * | 1/1979 | Driscoll | ..................... | E04B 2/82 52/220.7 |
| 4,203,639 A * | 5/1980 | VandenHoek | ......... | H02G 3/288 362/127 |
| 4,376,561 A * | 3/1983 | Vanden Hoek | ...... | H01R 25/161 439/679 |
| 4,429,934 A * | 2/1984 | VandenHoek | ......... | H02G 3/288 439/207 |
| 4,952,164 A * | 8/1990 | Weber | ..................... | H02G 3/288 439/652 |
| 5,013,252 A * | 5/1991 | Nienhuis | ................ | H02G 3/288 439/654 |
| 5,083,937 A * | 1/1992 | Bogiel | .................... | H02G 3/288 439/441 |
| 5,092,786 A * | 3/1992 | Juhlin | ................... | H01R 25/162 439/215 |
| 5,092,787 A * | 3/1992 | Wise | ....................... | H02G 3/288 439/211 |
| 5,131,860 A * | 7/1992 | Bogiel | ................. | H01R 25/162 439/211 |
| 5,158,472 A * | 10/1992 | Juhlin | .................. | H01R 25/162 439/215 |
| 5,186,640 A * | 2/1993 | McCoy | .................... | H02G 3/00 439/211 |
| 5,203,711 A * | 4/1993 | Bogiel | ................... | H02G 3/288 439/211 |

(Continued)

FOREIGN PATENT DOCUMENTS

CA 2738523 A1 * 11/2011 ........... H01R 12/777
CN 106981326 A * 7/2017

*Primary Examiner* — Timothy J. Dole
*Assistant Examiner* — Muhammed Azam
(74) *Attorney, Agent, or Firm* — Taylor IP, P.C.

(57) ABSTRACT

A mounting bracket assembly including at least one mount configured to be connected to a structure, a distribution harness configured to mount at least one electrical receptacle, and at least one bracket. The at least one bracket is configured to at least partially extend around the distribution harness and removably connect the distribution harness to the at least one mount.

15 Claims, 7 Drawing Sheets

(56) References Cited

U.S. PATENT DOCUMENTS

| | | | | | |
|---|---|---|---|---|---|
| 5,203,713 A * | 4/1993 | French | H02G 3/288 | | |
| | | | 439/211 | | |
| 5,252,086 A * | 10/1993 | Russell | H01R 25/00 | | |
| | | | 439/211 | | |
| 5,277,609 A * | 1/1994 | Ondrejka | H02G 3/00 | | |
| | | | 439/211 | | |
| 5,349,135 A * | 9/1994 | Mollenkopf | E04B 2/7422 | | |
| | | | 174/497 | | |
| 5,595,495 A * | 1/1997 | Johnson | H01R 25/16 | | |
| | | | 174/541 | | |
| 6,805,567 B2 * | 10/2004 | Chapman | H01R 25/006 | | |
| | | | 439/215 | | |
| 6,991,485 B2 * | 1/2006 | Plattner | H01R 13/514 | | |
| | | | 439/215 | | |
| 7,114,972 B1 * | 10/2006 | Riner | H01R 13/73 | | |
| | | | 439/215 | | |
| 7,144,264 B2 * | 12/2006 | Kochanski | H01R 25/16 | | |
| | | | 439/215 | | |
| 7,563,117 B2 * | 7/2009 | Riner | H01R 25/162 | | |
| | | | 439/209 | | |
| 7,658,002 B2 * | 2/2010 | Riner | H01R 25/162 | | |
| | | | 29/858 | | |
| 7,922,508 B2 * | 4/2011 | Kondas | H01R 25/161 | | |
| | | | 439/211 | | |
| 7,993,150 B1 * | 8/2011 | Crow | H01R 4/66 | | |
| | | | 439/215 | | |
| 2002/0137381 A1 * | 9/2002 | Chapman | H01R 25/006 | | |
| | | | 439/215 | | |
| 2003/0194884 A1 * | 10/2003 | Laukhuf | H01R 25/168 | | |
| | | | 439/32 | | |
| 2003/0194907 A1 * | 10/2003 | Riner | H01R 25/162 | | |
| | | | 439/532 | | |
| 2003/0201238 A1 * | 10/2003 | Riner | H01R 25/162 | | |
| | | | 211/26 | | |
| 2004/0045232 A1 * | 3/2004 | Gerber | H02G 3/00 | | |
| | | | 52/220.7 | | |
| 2004/0102072 A1 * | 5/2004 | Plattner | H01R 13/514 | | |
| | | | 439/215 | | |
| 2005/0067546 A1 * | 3/2005 | Dinh | H02G 3/125 | | |
| | | | 220/3.9 | | |
| 2005/0130476 A1 * | 6/2005 | Kochanski | H02G 3/00 | | |
| | | | 439/215 | | |
| 2006/0117684 A1 * | 6/2006 | Picard | H02G 3/00 | | |
| | | | 52/239 | | |
| 2006/0237601 A1 * | 10/2006 | Rinderer | H02G 3/125 | | |
| | | | 248/200.1 | | |
| 2008/0146054 A1 * | 6/2008 | Byrne | H01R 13/113 | | |
| | | | 439/110 | | |
| 2008/0188106 A1 * | 8/2008 | Byrne | H02G 3/288 | | |
| | | | 439/215 | | |
| 2008/0293276 A1 * | 11/2008 | Riner | H01R 25/164 | | |
| | | | 439/215 | | |
| 2009/0250573 A1 * | 10/2009 | Nuernberger | H02G 3/125 | | |
| | | | 248/316.1 | | |
| 2014/0238717 A1 * | 8/2014 | Korcz | H02G 3/08 | | |
| | | | 248/343 | | |
| 2015/0111403 A1 * | 4/2015 | Byrne | H01R 25/164 | | |
| | | | 439/119 | | |
| 2016/0241008 A1 * | 8/2016 | Korcz | H02G 3/125 | | |
| 2020/0378553 A1 * | 12/2020 | Oh | H02G 3/08 | | |

\* cited by examiner (PRIOR ART)
FIG. 1

MOUNTING BRACKET ASSEMBLY FOR AN ELECTRICAL RECEPTACLE SYSTEM

BACKGROUND OF THE INVENTION

1. Field of the Invention

The present invention relates to electrical receptacle systems, and, more particularly, to a bracket mounting system for mounting a distribution harness of an electrical receptacle system.

2. Description of the Related Art

Electrical receptacles are needed to receive and distribute power. Typically, electrical receptacles are permanently fixed within a structure. For example, an electrical receptacle may be embedded within a wall of a building or a surface of a desk. In some instances, it may be desirable to connect a group of receptacles together in a power distribution system.

Generally, a power distribution system includes multiple channel distribution harnesses and power cables, e.g. jumper cables, which interconnect the distribution harnesses together. Each distribution harness mounts multiple inlet connection points for receiving the power cables and receptacle connection points for receiving receptacles therein. Each distribution harness distributes electrical power from the power cables to the electrical receptacles. The power distribution system is typically mounted internally within a structure, such as a wall or a series of desks. As can be appreciated, the process of mounting a distribution harness to a structure is typically an arduous task because the installation point within the structure is typically a confined space with limited accessibility.

What is needed in the art is a cost-effective and easy to install power distribution system.

SUMMARY OF THE INVENTION

The present invention provides a mounting bracket assembly. The mounting bracket assembly includes at least one mount, a distribution harness, and at least one bracket. The at least one bracket removably connects the distribution harness to the at least one mount without requiring the user to use any tools or fasteners.

The invention in one form is directed to a mounting bracket assembly. The mounting bracket assembly includes at least one mount configured to be connected to a structure, a distribution harness configured to mount at least one electrical receptacle, and at least one bracket. The at least one bracket is configured to at least partially extend around the distribution harness and removably connect the distribution harness to the at least one mount.

The invention in another form is directed to an electrical receptacle system for a structure. The electrical receptacle system includes a frame member and a mounting bracket assembly. The mounting bracket assembly includes at least one mount connected to the frame member, a distribution harness configured to mount at least one electrical receptacle, and at least one bracket. The at least one bracket is configured to at least partially extend around the distribution harness and removably connect the distribution harness to the at least one mount.

The invention in yet another form is directed to a method for assembling an electrical receptacle system. The method includes an initial step of providing a mounting bracket assembly. The mounting bracket assembly includes at least one mount configured to be connected to a structure, a distribution harness configured to mount at least one electrical receptacle, and at least one bracket. The method also includes positioning the distribution harness adjacent to the at least one mount. The method also includes connecting the at least one bracket to the at least one mount such that the at least one bracket at least partially extends around the distribution harness and secures the distribution harness to the at least one mount.

An advantage of the present invention is that the one or more brackets of the mounting bracket assembly provide for a toolless installation and removal of the distribution harness.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
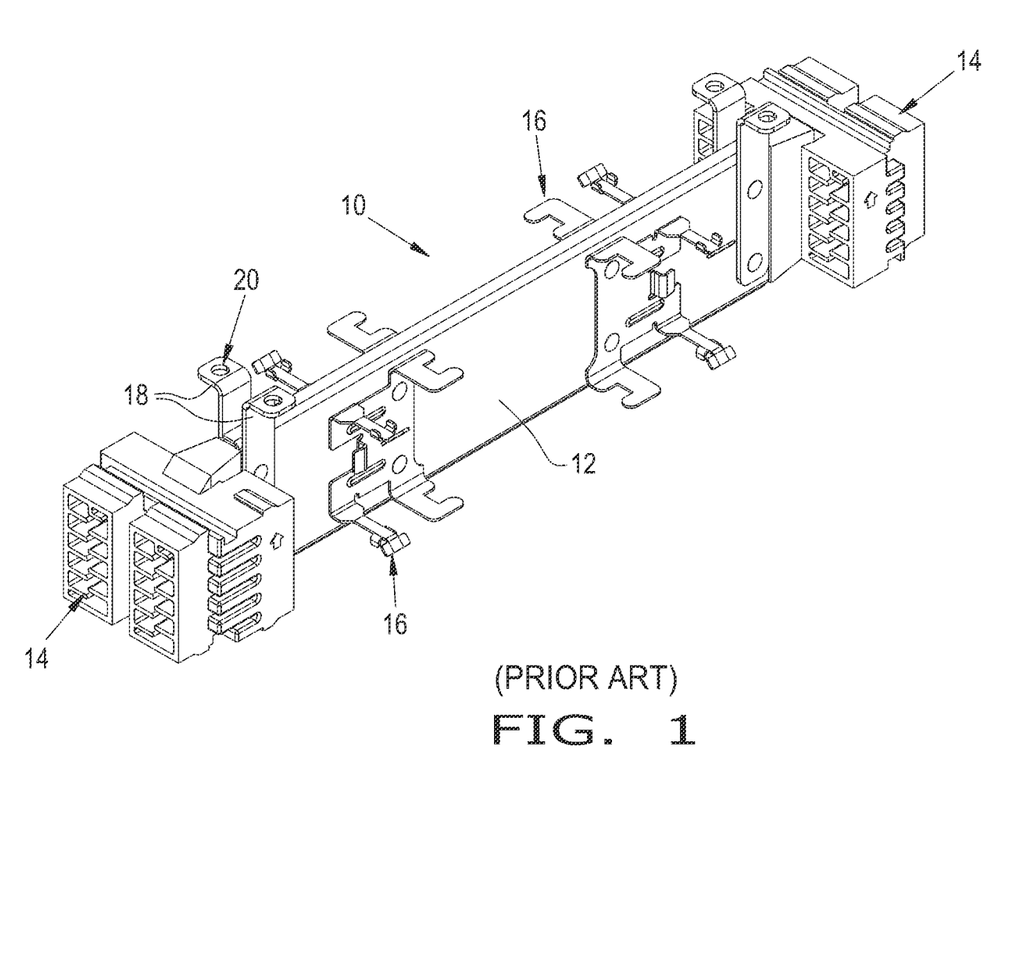
FIG. 1 is a perspective view of a known mounting bracket assembly for mounting multiple electrical receptacles.

Referring now to the drawings, and more particularly to FIG. 1, there is shown a known mounting bracket assembly 10 for mounting one or more electrical components, such as electrical inlets and outlets. The mounting bracket assembly 10 serves to provide a point of attachment and electrical connection for duplex receptacles, flexible panel connectors, and power entry components. The mounting bracket assembly 10 includes a distribution harness 12, inlet connection points 14, e.g. jumpers, for receiving power cables, e.g. jumper cables, and receptacle connection points 16 for mounting electrical receptacles. The distribution harness 12 may comprise a body and multiple wires for distributing electrical power from the inlet connection points 14 to the electrical receptacles. The mounting bracket assembly 10 also includes beam or rail mounts 18 that are fixedly attached to the distribution harness 12.

To connect the assembly 10 to a desired member, such as a frame member of a desk, a user must insert a fastener, e.g. screw, through a through hole 20 in each beam mount 18 and screw the fastener into the frame member. Typically, the beam mounts 18 fixedly attach to a horizontal beam of a panel or a desk. As can be appreciated, the process of screwing the assembly 10 to a frame component, which is usually in a confined space such as underneath a desk, can be an arduous task.

Figure 4:
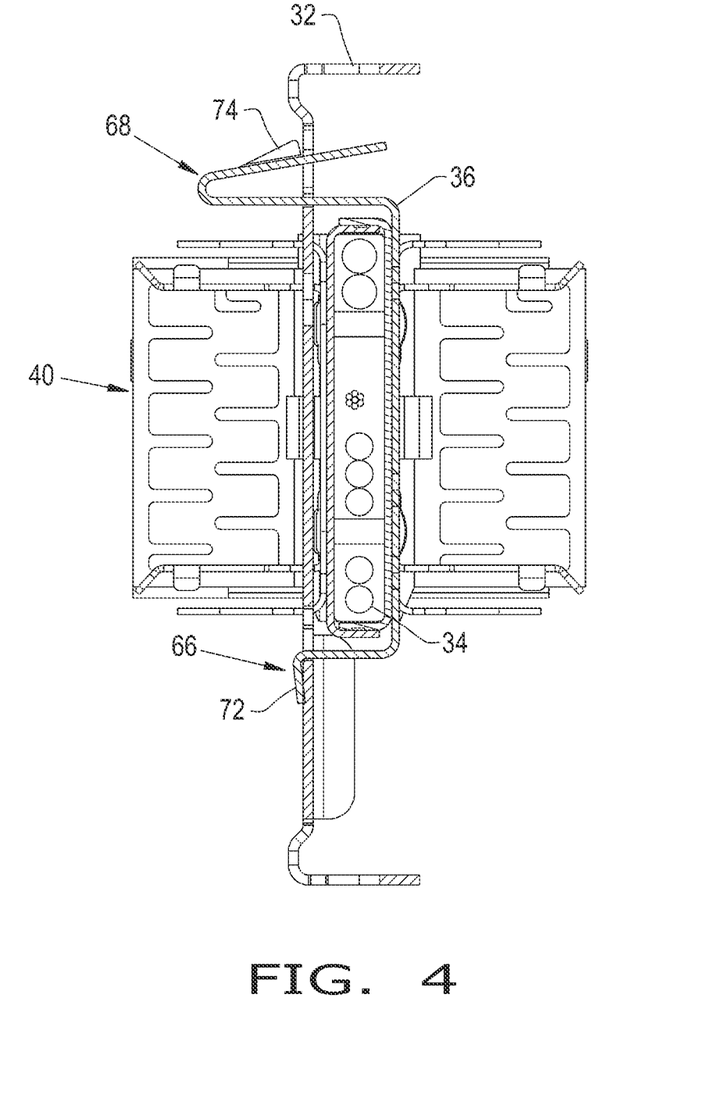
FIG. 4 is a cross sectional view of the mounting bracket assembly, taken across line 4-4 in FIG. 3.
Figure 5:
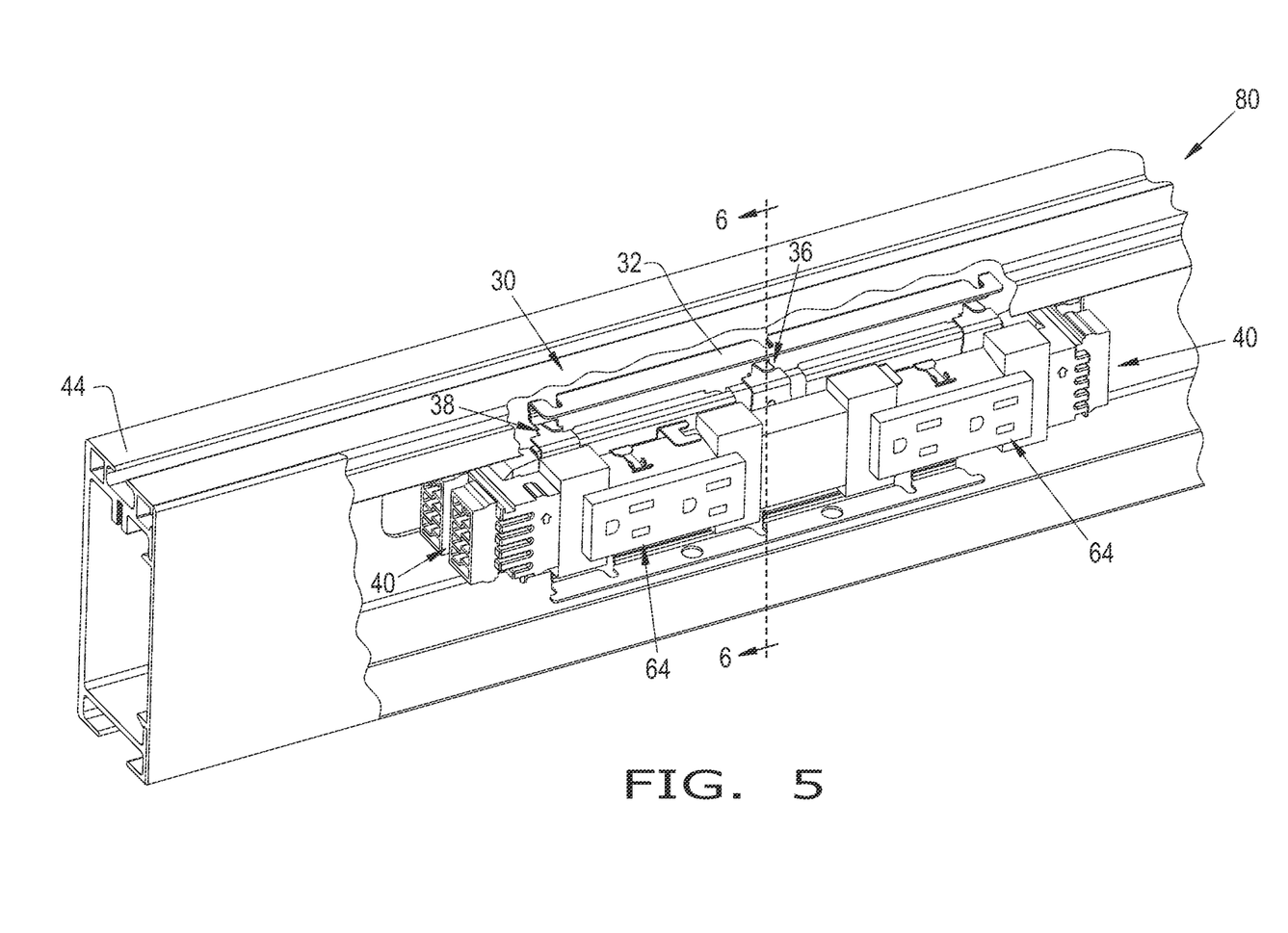
FIG. 5 is a front perspective view of the mounting bracket assembly of FIGS. 1-4 mounted in a member of a structure.

Referring now to FIGS. 2-7, there is shown an exemplary embodiment of a mounting bracket assembly 30 that includes at least one mount 32, a distribution harness 34, and at least one bracket 36, 38 for removably connecting the distribution harness 34 to the at least one mount 32. The mounting bracket assembly 30 also includes at least one inlet connection point 40 for receiving at least one power cable and at least one receptacle connection point 42 for mounting at least one electrical receptacle (FIG. 5).

Figure 6:
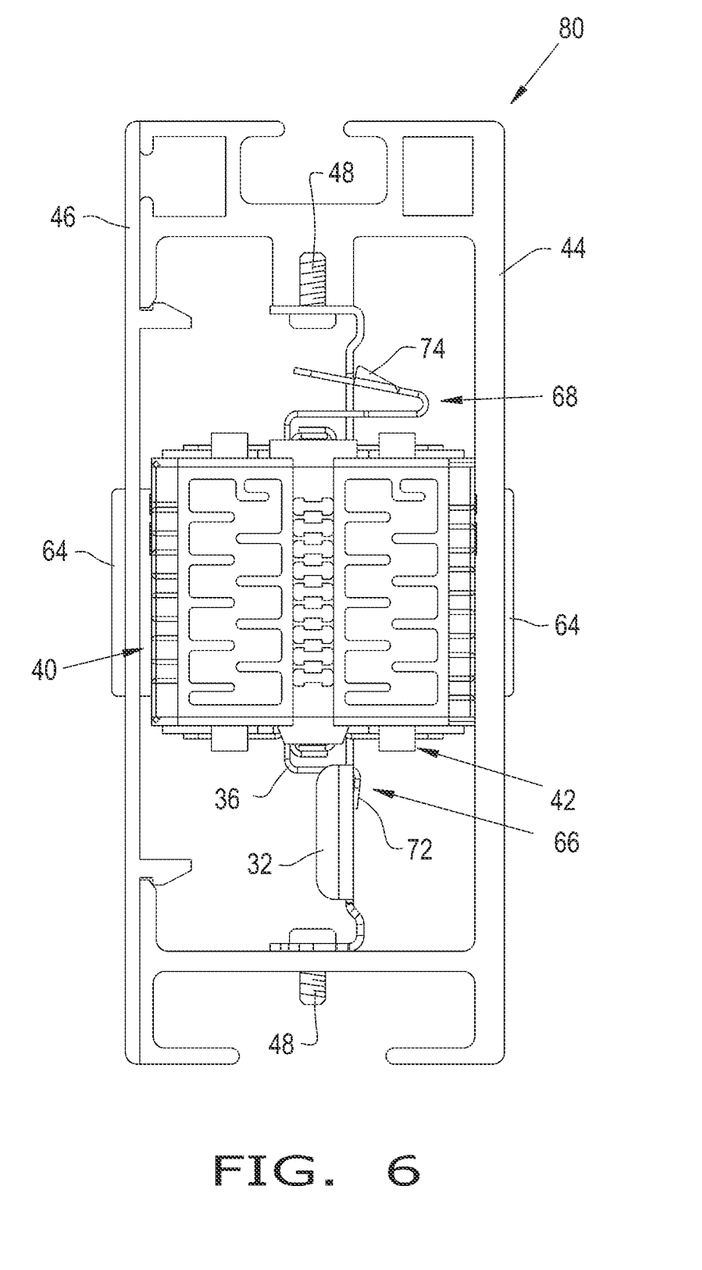
FIG. 6 is a cross sectional view of the mounting bracket assembly, taken across line 6-6 in FIG. 5.

This mounting bracket assembly 30 provides an easy and toolless installation and removal of the distribution harness 34 such that it can be adapted to any desired structure, such as an object, including but not limited to a desk or a wall panel system. For example, the mounting bracket assembly 30 may be connected to a member 44 of a structure, such as a beam, a support member, a desk, a panel, a wall, or any other desired member (FIG. 5). Additionally, for example, the mounting bracket assembly 30 can be connected to a vertical post of a desk. Also, a cover 46 for substantially covering the mounting bracket assembly 30 may be connected to the frame member 44 (FIG. 6). For instance, the cover 46 may be snap-fitted onto the frame member 44. Furthermore, the mounting bracket assembly 30 can be incorporated as part of an electrical receptacle system 80 of a structure (FIGS. 5-6).

The at least one mount 32 may serve as an intermediary member which couples the distribution harness 34 to the desired member of the structure. The at least one mount 32 can be connected to the object in any desired fashion. For example, the at least one mount 32 can be fastened via one or more fasteners 48 to the frame member 44 of the structure (FIG. 6). Alternatively, the at least one mount 32 may be connected to the object via a tongue and groove connection. Each fastener 48 may be in the form of any desired fastener, such as a screw, bolt, anchor, clip, etc.

Figure 2:
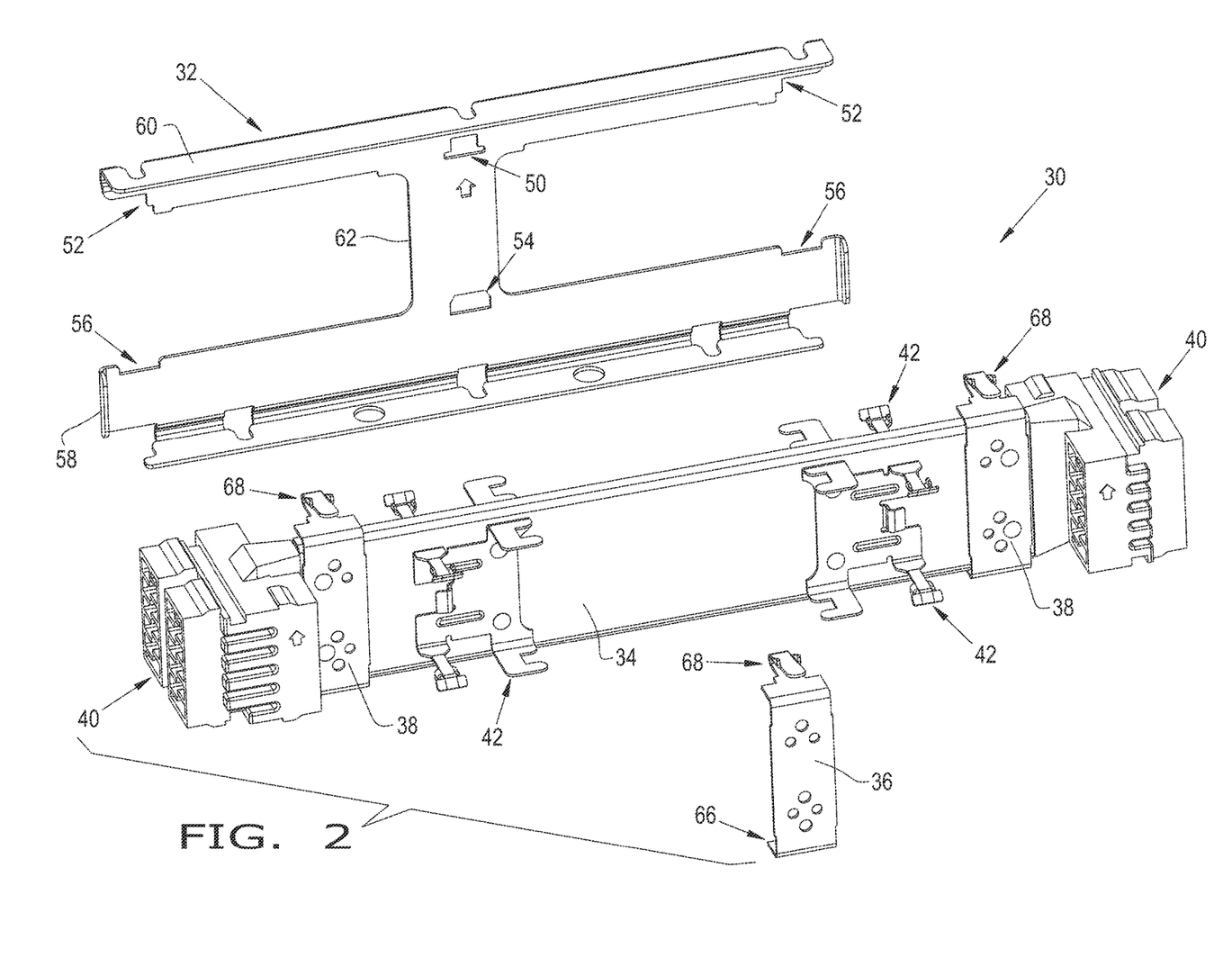
FIG. 2 is an exploded view of an embodiment of a mounting bracket assembly which includes at least one mount, a distribution harness, and at least one bracket for connecting the distribution harness to the at least one mount.
Figure 3:
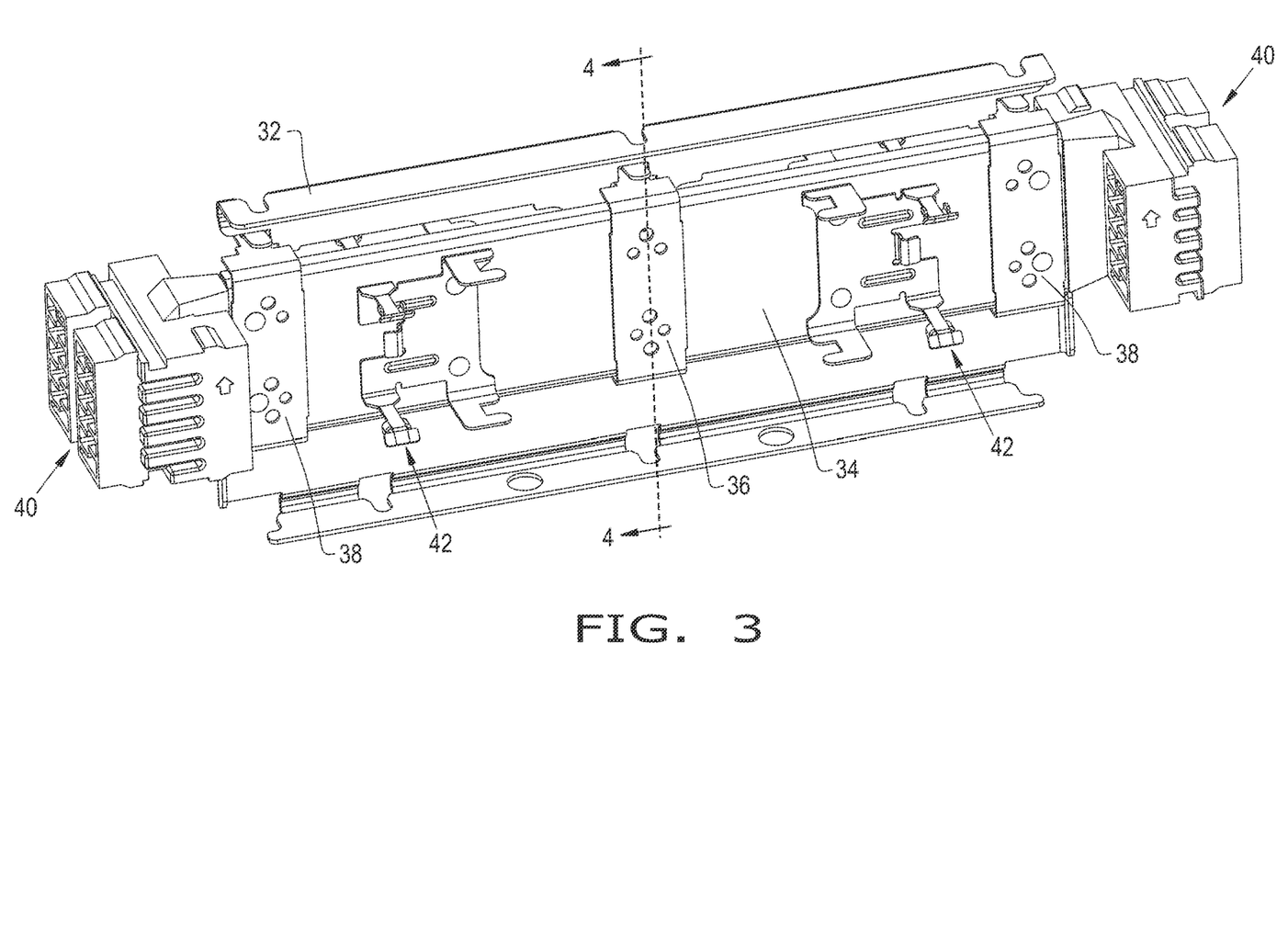
FIG. 3 is a front perspective view of the mounting bracket assembly of FIG. 2.

The at least one mount 32 may include multiple mating features 50, 52, 54, 56. For instance, the at least one mount 32 may include one or more upper receiving holes 50, upper recesses 52, lower receiving holes 54, and/or lower recesses 56 which are configured for receiving the at least one bracket 34. The at least one mount 32 may also include a first, lower elongated member 58, a second, upper elongated member 60 parallel to the lower elongated member 58, and a transverse connecting member 62 that connects the lower and upper elongated members 58, 60 (FIG. 2). The at least one mount 32 may be a single component. For instance, the at least one mount 32 may be in the form of a monolithic plate or strut 32. The at least one mount 32 may comprise any desired shape and size. For instance, the at least one mount 32 may have an "H"-shaped cross-section.

It should be appreciated that at least one mount 32 may be a multipart part which includes two or more sections that may or may not be connected to one another. For example, the at least one mount can be in the form of two parallel rail members which each have mating features thereon. It should also be appreciated that the mounting bracket assembly 30 may not include a mount 32 such that the bracket(s) 36, 38 directly couples to the desired frame member of the structure.

The distribution harness 34 is removably connected to the mount 32. The distribution harness 34 can be in the form of any desired distribution harness with any desired shape, size, and wiring configuration. For instance, the wiring configuration of the distribution harness 34 may comprise a 2, 4, 8, or 10 wire configuration. The distribution harness 34 may mount and distribute electrical power in between two or more electrical components. For example, the distribution harness 34 may mount and distribute electrical power between the inlet and receptacle connection points 40, 42. The inlet connection points 40 may be located at the lateral ends of the distribution harness 34. The receptacle connection points 42 can located at the front and back of the distribution harness 34. As shown in FIGS. 5-6, receptacles 64 can be fitted within the receptacle connection points 42.

The at least one bracket 36, 38 is configured to at least partially extend around the distribution harness 34 and removably connect the distribution harness 34 to the at least one mount 32. The at least one bracket 36, 38 can be in the form of only one bracket or two or more brackets. For example, the mounting bracket assembly 30 may include only one bracket 36 which connects to the transverse connecting member 62. Additionally, for example, the mounting bracket assembly 30 may include two or more brackets 36, 38 which may or may not be identical to one another. As shown, the mounting bracket assembly 30 has three brackets, including a center bracket 36 and a pair of lateral end brackets 38. The center bracket 36 can be removably connected to the at least one mount 32. The end brackets 38 can be fixedly attached, e.g., riveted, to the distribution harness 34. The at least one bracket 36, 38 may comprise any desired shape for corresponding securing any desired shape of distribution harness 34.

Figure 7:
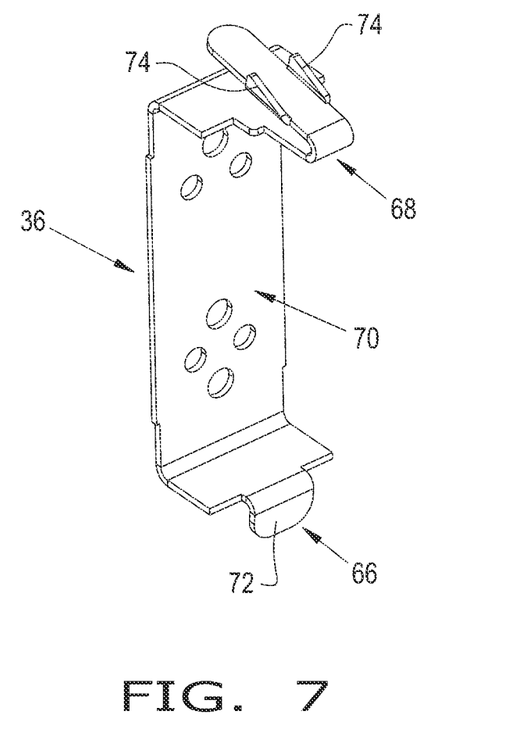
FIG. 7 is a perspective view of the at least one bracket of FIGS. 1-6.

The at least one bracket 36, 38 may include a first, lower latching member 66, a second, upper latching member 68, and an elongated member 70 that connects the lower and upper latching members 66, 68 with each other (FIG. 7). The lower latching member 66 can have a downwardly extending protrusion 72 that engages with the receiving hole 54 or recess 56 of the at least one mount 32. The lower latching member 66 can be rigid such that it does not bend or flex. The lower latching member 66 may movably engage with the at least one mount 32 so that it forms a hinge upon contacting the at least one mount 32. For instance, upon inserting the lower latching member 66 of the center bracket 36 into the receiving hole 54, the connection point of the protrusion 72, i.e., the bent joint which results therefrom, may allow the other portions of the bracket 36 to pivot or hinge relative to the at least one mount 32. The upper latching member 68 may have a flexible end 74 that is configured to snap-fit into the receiving hole 50 or recess 52 of the at least one mount 32. In other words, the upper latching member 68 can have a folded over portion 74 that flexes relative to the other body portions of the at least one bracket 36, 38. The upper latching member 68 may also have one or more protrusions 74, e.g. tab(s), that engage with the backside of the mount (FIG. 4). Thereby, the protrusions 72, 74 may together lock the at least one bracket 36, 38 onto the at least one mount 32. It is noted that only the bracket 36 is shown in detail in FIG. 7; however, each end bracket 38 may be substantially similar to the bracket 36 may thereby also include the protrusions 72, 74 of the members 66, 68 as discussed above with reference to the bracket 36.

In operation, a user may conduct a method to assemble the electrical receptacle system 80 within the structure. The method may include connecting the at least one mount 32 to the desired member 44 of the structure. For instance, the user may screw the at least one mount 32 onto the member 44 via one or more fasteners 48. Then, the user may position the distribution harness 34 adjacent to the at least one mount 32. The distribution harness 34 may or may not have the various electrical components, e.g. electrical receptacles 64, affixed thereto at this point. Once the distribution harness 34 is located properly relative to the at least one mount 32, the user may removably connect the at least one bracket 36, 38 to the at least one mount 32 in order secure the distribution harness to the at least one mount 32. It should be appreciated that the end brackets 38 may or may not be affixed to the distribution harness 34 before connecting the distribution harness 34 to the at least one mount 32. For example, the end brackets 38 may be pre-attached to the distribution harness 34, and the user may accordingly only need to attach the bracket 36 and snap-fit the end brackets 38. The user may first position the lower latching member 66 within the receiving hole 54 of the at least one mount 32. Then, the user may apply a force onto the at least one bracket 36 so that the at least one bracket 36 may inwardly pivot or otherwise hinge relative to the at least one mount 32. In this regard, the at least one bracket 36 self-aligns the upper latching member 68. The user may then press-fit the upper latching member 68 into the respective receiving hole 50 so that the protrusion(s) 74 is engaged with the backside of the at least one mount 32. As can be appreciated, the brackets 36, 38 can be simultaneously snap-fitted into the at least one mount 32. Thus, the at least one bracket 36, 38 can at least partially wrap around the distribution harness 34 for securing the distribution harness 34 onto the at least one mount 32. Thereafter, the user may easily disengage the at least one bracket 36, 38 by depressing the end of the upper latching member 68 and outwardly pivoting the at least one bracket 36, 38.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mounting bracket assembly, comprising:
   at least one mount configured to be connected to a structure, the at least one mount having a receiving hole or recess;
   a distribution harness configured to mount at least one electrical receptacle; and
   at least one bracket configured to at least partially extend around the distribution harness and removably connect the distribution harness to the at least one mount, wherein the at least one bracket comprises a first latching member, a second latching member, and an elongated member connecting the first latching member and the second latching member, the first latching member having a flexible end that is configured to snap-fit into the receiving hole or the recess in the mount.

2. The mounting bracket assembly of claim 1, wherein the first latching member comprises a first protrusion configured to engage with the at least one mount.

3. The mounting bracket assembly of claim 2, wherein the first protrusion is configured to movably engage with the at least one mount such that the at least one bracket hinges relative to the at least one mount.

4. The mounting bracket assembly of claim 1, wherein the second latching member comprises a flexible end configured to snap-fit into the at least one mount.

5. The mounting bracket assembly of claim 1, wherein the at least one mount has a frontside and a backside, wherein the second latching member further comprises a second protrusion configured to engage with the backside of the at least one mount.

6. The mounting bracket assembly of claim 1, wherein the at least one mount comprises a plurality of mating features including a first mating feature configured to receive the first latching member and a second mating feature configured to receive the second latching member.

7. The mounting bracket assembly of claim 1, wherein the at least one bracket comprises a plurality of brackets.

8. A mounting bracket assembly, comprising:
   at least one mount configured to be connected to a structure;
   a distribution harness configured to mount at least one electrical receptacle; and
   at least one bracket configured to at least partially extend around the distribution harness and removably connect the distribution harness to the at least one mount, wherein the at least one mount comprises a first elongated member, a second elongated member parallel to the first elongated member, and a transverse connecting member connecting the first elongated member and the second elongated member.

9. The mounting bracket assembly of claim 8, wherein the at least one bracket is configured to connect to the transverse connecting member.

10. An electrical receptacle system for a structure, comprising:
    a frame member; and
    a mounting bracket assembly, comprising:
      at least one mount connected to the frame member;
      a distribution harness configured to mount at least one electrical receptacle; and
      at least one bracket configured to at least partially extend around the distribution harness and removably connect the distribution harness to the at least one mount, wherein the at least one bracket comprises a first latching member, a second latching member, and an elongated member connecting the first latching member and the second latching member, wherein the first latching member comprises a first protrusion configured to engage with the at least one mount, wherein the first protrusion is configured to movably engage with the at least one mount such that the at least one bracket hinges relative to the at least one mount.

11. The electrical receptacle system of claim 10, wherein the second latching member comprises a flexible end configured to snap-fit into the at least one mount.

12. The electrical receptacle system of claim 10, wherein the at least one mount has a frontside and a backside, wherein the second latching member further comprises a second protrusion configured to engage with the backside of the at least one mount.

13. The electrical receptacle system of claim 10, wherein the at least one mount comprises a plurality of mating features including a first mating feature configured to receive the first latching member and a second mating feature configured to receive the second latching member.

14. An electrical receptacle system for a structure, comprising:
- a frame member; and
- a mounting bracket assembly, comprising:
    - at least one mount connected to the frame member;
    - a distribution harness configured to mount at least one electrical receptacle; and
    - at least one bracket configured to at least partially extend around the distribution harness and removably connect the distribution harness to the at least one mount, wherein the at least one mount comprises a first elongated member, a second elongated member parallel to the first elongated member, and a transverse connecting member connecting the first elongated member and the second elongated member.

15. The electrical receptacle system of claim 14, wherein the at least one bracket is configured to connect to the transverse connecting member.

* * * * *

UNITED STATES PATENT AND TRADEMARK OFFICE
CERTIFICATE OF CORRECTION

| | | |
|---|---|---|
| PATENT NO. | : 11,527,875 B2 | |
| APPLICATION NO. | : 17/144361 | |
| DATED | : December 13, 2022 | |
| INVENTOR(S) | : Raymond H. Riner | |

It is certified that error appears in the above-identified patent and that said Letters Patent is hereby corrected as shown below:

On the Title Page

In the title, after "ASSEMBLY" but before "FOR", insert --WITH CENTRAL MOUNT--.

In the Specification

Column 1
In the title, after "ASSEMBLY" but before "FOR", insert --WITH CENTRAL MOUNT--.

Signed and Sealed this
Thirtieth Day of July, 2024

*Katherine Kelly Vidal*

Katherine Kelly Vidal
*Director of the United States Patent and Trademark Office*